US010197399B2

(12) United States Patent
Wirbel et al.

(10) Patent No.: US 10,197,399 B2
(45) Date of Patent: Feb. 5, 2019

(54) METHOD FOR LOCALIZING A ROBOT IN A LOCALIZATION PLANE

(71) Applicants: SOFTBANK ROBOTICS EUROPE, Paris (FR); ASSOCIATION POUR LA RECHERCHE ET LE DEVELOPPEMENT DE MÉTHODES ET PROCESSUS INDUSTRIELS—ARMINES, Paris (FR)

(72) Inventors: Emilie Wirbel, Paris (FR); Arnaud de la Fortelle, Paris (FR)

(73) Assignees: SOFTBANK ROBOTICS EUROPE, Paris (FR); ASSOCIATION POUR LA RECHERCHE ET LE DEVELOPPEMENT DE MÉTHODES ET PROCESSUS INDUSTRIELS—ARMINES, Paris (FR)

( * ) Notice: Subject to any disclaimer, the term of this patent is extended or adjusted under 35 U.S.C. 154(b) by 140 days.

(21) Appl. No.: 15/128,901

(22) PCT Filed: Apr. 14, 2015

(86) PCT No.: PCT/EP2015/058011
§ 371 (c)(1),
(2) Date: Sep. 23, 2016

(87) PCT Pub. No.: WO2015/158682
PCT Pub. Date: Oct. 22, 2015

(65) Prior Publication Data
US 2017/0131102 A1 May 11, 2017

(30) Foreign Application Priority Data
Apr. 14, 2014 (EP) .................................. 14305543

(51) Int. Cl.
G01C 21/16 (2006.01)
G05D 1/02 (2006.01)

(52) U.S. Cl.
CPC ......... G01C 21/165 (2013.01); G05D 1/0272 (2013.01); G05D 2201/0217 (2013.01)

(58) Field of Classification Search
CPC .............. G01C 21/165; G05D 1/0272; G05D 2201/0217
(Continued)

(56) References Cited

U.S. PATENT DOCUMENTS 7,135,992 B2 * 11/2006 Karlsson ................. G01C 21/12
340/995.1
7,689,321 B2 * 3/2010 Karlsson .............. G05D 1/0246
318/103
(Continued)

FOREIGN PATENT DOCUMENTS

FR 3004570 A1 10/2014
WO 2004/059900 A2 7/2004

OTHER PUBLICATIONS

Emilie Wirbel et al., "Humanoid robot navigation: getting localization information from vision," Journal of Intelligent Systems, Jan. 28, 2014, pp. 113-132, XP055147460.

Primary Examiner — Jaime Figueroa
(74) Attorney, Agent, or Firm — Baker & Hostetler LLP

(57) ABSTRACT

A method for localizing a robot in a localization plane with a bi-dimentional reference with axis x and y comprises: determining by odometry an estimation of coordinates x1 and y1 and orientation θ1 of the robot; determining an estimation θ2 of the orientation of the robot using a virtual compass; determining an estimation θ3 of the orientation of the robot by correlating parts of a reference and a query panorama; determining an estimation x4, y4 of the robot position using Iterative Closest Points; determining standard
(Continued)

deviations σ_x1, σ_x2, σ_θ1 σ_θ2, σ_θ3, σ_x4, σ_y4 of the estimations; determining probability distributions G(x1), G(y1), G(θ1), G(θ2), G(θ3), G(x4), G(y4) of each estimation using standard deviations; determining three global distributions GLOB(x), GLOB(y), GLOB(θ) and a global estimation xg, yg of the coordinates of the robot in the localization plane and a global estimation θg of its orientation by applying maximum likelihood to global distributions.

8 Claims, 3 Drawing Sheets

(58) Field of Classification Search
USPC .................................................. 700/245, 259
See application file for complete search history.

(56) References Cited

U.S. PATENT DOCUMENTS

| | | | |
|---|---|---|---|
| 8,073,528 B2* | 12/2011 | Zhao | B25J 9/1689 600/424 |
| 2004/0167667 A1* | 8/2004 | Goncalves | G01C 21/12 700/245 |
| 2009/0024251 A1 | 1/2009 | Myeong et al. | |
| 2012/0330447 A1* | 12/2012 | Gerlach | G01B 11/24 700/95 |
| 2013/0156262 A1* | 6/2013 | Taguchi | G06T 7/75 382/103 |
| 2014/0002597 A1* | 1/2014 | Taguchi | H04N 13/0275 348/43 |
| 2015/0304634 A1* | 10/2015 | Karvounis | H04N 13/0239 348/46 |

* cited by examiner

METHOD FOR LOCALIZING A ROBOT IN A LOCALIZATION PLANE

CROSS-REFERENCE TO RELATED APPLICATIONS

This application is a National Stage of International patent application PCT/EP2015/058011, filed on Apr. 14, 2015, which claims priority to foreign European patent application No. EP 14305543.2, filed on Apr. 14, 2014, the disclosures of which are incorporated by reference in their entirety.

FIELD OF THE INVENTION

This invention relates to method for localizing a robot in a localization plane and is particularly, but not exclusively, applicable to navigation techniques and robotics.

BACKGROUND

Navigation and localization is a crucial problem of robotics, as it is an essential aspect to collaboration between a human and a robot. In a human populated environment, such as an apartment, the challenges are even higher, because of the additional complexity.

Humanoid robots, due to their aspect and possibilities, are particularly adapted to human environments. However, they present specific constraints: walking makes their progress slower, less predictable than wheeled robots for example.

They are able to compensate some of their limits by performing actions which are more difficult for a standard robot, for example turning the head to look around, stepping over an obstacle etc.

Several approaches already exist to provide a robot with a navigation system. In the french patent application n°1353295, a method to measure and correct the drift of the robot in terms of heading angle has been proposed. This allows the robot to walk in a straight line or to perform rotations with a much higher precision than the open loop walk. The aim here is to provide an absolute localization solution, with at least qualitative or partially metric information.

The richest sensor of the robot is the monocular color camera. Performing a metric visual Simultaneous Localization And Mapping (SLAM) directly is not a good idea: the odometry is not reliable enough, and it is very difficult to accurately track keypoints because of the motion blur during the walk, the limited camera field of view and the height of the robot. This implies that a topological, qualitative representation is more adapted if we do not want to compensate these drawbacks with heavy hypotheses on the environment such as a pre-built 3D map.

SUMMARY OF THE INVENTION

The invention concerns a method for localizing a robot in a localization plane associated with a bi-dimentional reference with two axis x and y comprising the following steps:
  determining by odometry an estimation of the coordinates x1 and y1 of the robot in the localization plane as well as an estimation of its orientation $\theta 1$ relatively to a reference direction;
  determining an estimation $\theta 2$ of the orientation of the robot by using a virtual compass which identifies at least two pairs of points of interest, first points of each pair being identified in a reference panorama and second point of each pair being identified in a query panorama, this step being initialized with $\theta 1$;
  determining an estimation $\theta 3$ of the orientation of the robot by correlating parts of the reference panorama with parts of the query panorama and by identifying when that correlation is maximized, this step being initialized with one of the previous estimations of the orientation;
  determining an estimation x4, y4 of the robot position in the localization place by using an Iterative Closest Points technique, this step being initialized with x1 and y1;
  determining the standard deviations $\sigma\_x1$, $\sigma\_x2$, $\sigma\_\theta 1$ $\sigma\_\theta 2$, $\sigma\_\theta 3$, $\sigma\_x4$, $\sigma\_y4$ of the aforementioned estimations;
  determining probability distributions G(x1), G(y1), G($\theta$1), G($\theta$2), G($\theta$3), G(x4) and G(y4) of each available estimation using said standard deviations;
  determining three global distributions GLOB(x), GLOB(y) and GLOB($\theta$) respectively for the coordinates along the x and y axis and for the orientation $\theta$ of the robot by combining said Gaussian probability distributions and determining a global estimation xg, yg of the coordinates of the robot in the localization plane as well as an global estimation $\theta$g of its orientation by applying the method of maximum likelihood to the global distributions.

As an example, the estimations provided by a given step are used by a subsequent step only if considered as reliable.

As an example, an estimation is considered as reliable when its standard deviation is lower than a predefined threshold.

As an example, the probability distributions G(x1), G(y1), G($\theta$1), G($\theta$2), G($\theta$3), G(x4) and G(y4) are Gaussian probability distributions.

As an example, the global probability distributions are derived as follow:

$$GLOB(x)=G(x1) \times G(x4)$$

$$GLOB(y)=G(y1) \times G(y4)$$

$$GLOB(\theta)=G(\theta 1) \times G(\theta 2) \times G(\theta 3)$$

As an example, $\theta$3 value is estimated based on an image template matching which is performed over two pyramids of images, a first pyramid of images being generated from a single reference image by downscaling it using several scaling steps, the second pyramid of images being generated from a single query image by downscaling it using several scaling steps.

The invention also concerns a humanoid robot comprising at least:
  at least one extractor of image;
  processing capabilities adapted to implement the method according to one of the preceding claims.

As an example, the humanoid robot comprises a 2D RGB camera in order to construct a query panorama comprising at least one reference image.

As an example, the humanoid robot comprises a 3D sensor which is used to compute point clouds in order to implement the Iterative Closest Point Technique.

The invention also concerns a computer program product, stored on a computer readable medium comprising code means for causing a computer to implement the method described above.

BRIEF DESCRIPTION OF THE DRAWINGS

A better understanding of the embodiments of the present invention can be obtained from the following detailed description in conjunction with the following drawings, in which.

DETAILED DESCRIPTION

Figure 1:
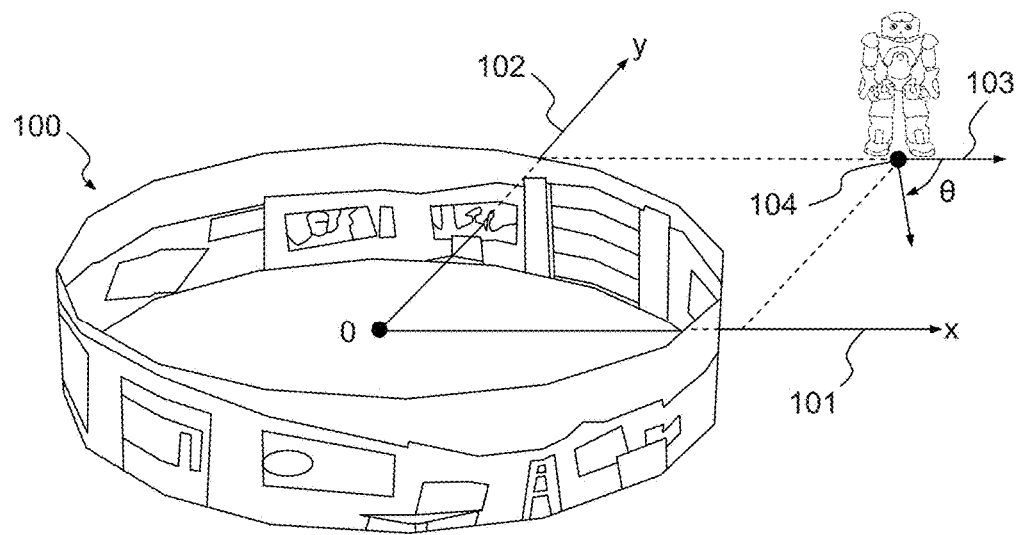
FIG. 1 gives an example of a reference panorama which can be used as an input of the method according to the invention.

FIG. 1 gives an example of a reference panorama which can be used as an input of the method according to the invention.

As already mentioned, the invention concerns a method for locating a mobile element, for example a robot. It localizes the robot compared to at least a reference panorama 100, which is composed of a plurality of RGB (Red-Green-Blue) images and/or 3D images.

The robot 104 is located in a horizontal plane thanks to a two axis reference 101, 102. The origin O of this reference corresponds to the centre of the reference panorama. Additionally, the orientation θ of the robot can be estimated compared with a reference direction 103.

At least a query panorama is also used for the localization process and can be composed of a smaller set of images. The query panorama is composed of at least one image captured at the time of the localization process.

Figure 2:
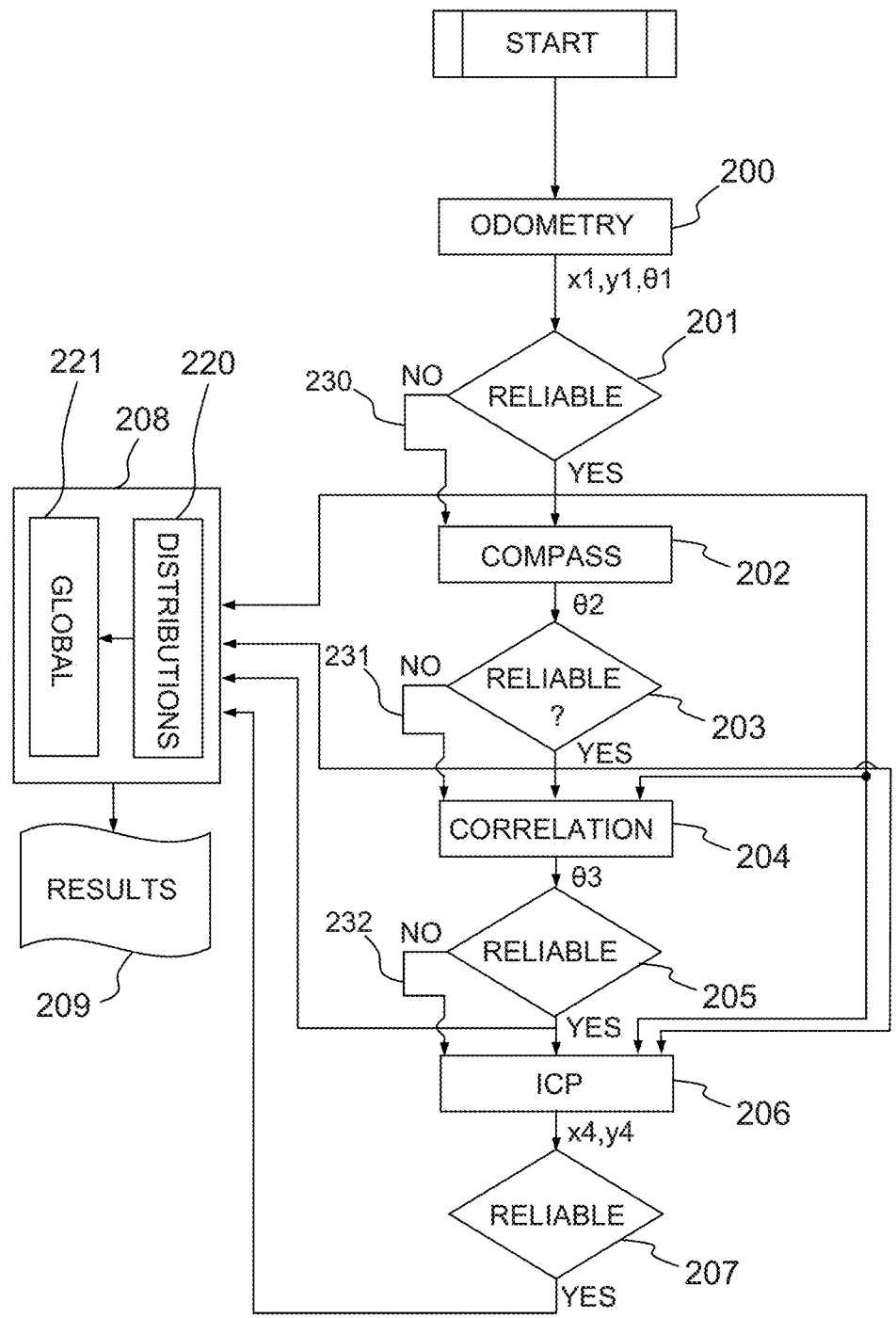
FIG. 2 is an illustration of a method for localizing a robot.

FIG. 2 is an illustration of the method according to the invention. The method uses a set of elementary localization techniques corresponding to steps 200, 202, 204, 206.

A key aspect of the invention is that the use of these localization techniques is organized hierarchically. This means that the less complex and less reliable localization technique 200 are applied first. The subsequent localization steps 202, 204, 206 are then the more complex and reliable ones.

This hierarchical organization allows reducing the overall computational complexity as well as the false positive rate. For that purpose, the estimated localization information provided by each step is used to feed the following steps and is used as preliminary hypothesis.

The estimated localization data provided by each step are then combined using a generic method based on probabilistic representations.

More precisely, a first estimation step 200 implements a localization based on odometry. This technique is based on the robot position sensors which integrate the displacements of the robot in order to estimate its position. When used alone, this technique may be subject to a high estimation drift. This is mainly because the odometry sensors do not take into account default such as slippery grounds or bumps.

The results of this estimation 200 are:
  x1: an estimation of the x localization coordinate;
  y1: an estimation of the y localization coordinate;
  θ1: an estimation of angle θ.

When these intermediate results are made available, their uncertainty is estimated 201. The standard deviations $\sigma\_x1$, $\sigma\_y1$, $\sigma\_\theta1$ of x1, y1 and θ1 estimations can be used for that purpose. In a preferred embodiment, estimation is considered as reliable when its standard deviation is lower than a predefined threshold.

As an example, if the drift (experimentally evaluated) is equal to five percents and the robot has walked one meter along the x axis, the standard deviation along the x axis $\sigma\_x1$ will be equal to five centimeters. If the predefined threshold is equal to six centimeters, the x1 estimation is considered as reliable.

In one embodiment, x1, y1 and θ1 are transmitted for being used by steps 202, 204, 206 only if they are considered as reliable.

Step 202 implements a virtual compass which provides an estimation θ2 of the orientation of the robot. For that purpose, a 2D RGB camera embedded on the robot is used.

This technique is described in the french patent application n°1353295. For that purpose, one or several images are compared to a set of reference images (i.e. the reference panorama) in order to compute the theta orientation of the robot. This technique allows estimating an angular deviation relative to a reference direction, that is to say the theta angle. For that purpose, a reference image representative of a reference direction is used. Then, a current image which is representative of the current orientation of the robot is loaded.

A plurality of points of interest is then identified in these two images. At least two pairs of points of interest are then indentified. Such a pair is obtained by searching for a first point of interest identified in the current image and by searching for a second point of interest in its corresponding reference image. Finally, the angular deviation θ2 between the current direction of the moving element and the reference direction is estimated using at least two pairs of points.

Advantageously, if step 202 is applied with preliminary hypotheses which have been generated by step 200, step 202 can be used with a reduced search range in the reference image which lowers the estimation complexity. Another advantage is that it is then possible to find the correct match quicker.

Additionally, the risk of false matches between points of interest is lower. The search is performed starting from the said hypotheses.

The uncertainty which is introduced by step 202 estimation can be derived 203 from the percentage of reliable matches. For that purpose, the quality of the estimation provided by step 202 is considered sufficient when the number of identified pairs of points of interest exceeds a predetermined threshold value. If this is the case, the estimation quality is considered sufficient and θ2 will be used as a preliminary hypothesis for the application of step 204.

Alternatively, the standard deviation $\sigma\_\theta2$ of θ2 can be used to check 203 the reliability of this estimation. As already explained, an estimation can be considered as reliable when its standard deviation is lower than a predefined threshold.

In one embodiment, θ2 is transmitted for being used by step 204, 206 only if it is considered as reliable.

In step 204, a θ3 value is estimated based on an image template matching which is performed over two pyramids of images. The template matching is based on the same equations as those described in the article of Matsumoto, Y.; Inaba, M.; Inoue, H., entitled "Visual navigation using view-sequenced route representation", *IEEE International Conference on Robotics and Automation*, vol. 1, pp. 83, 88, 22-28 Apr. 1996. However this particular article works on comparing sequences of images with comparable scales, whereas the following description makes no assumption on the image relative scales and the distance between them.

Figure 3:
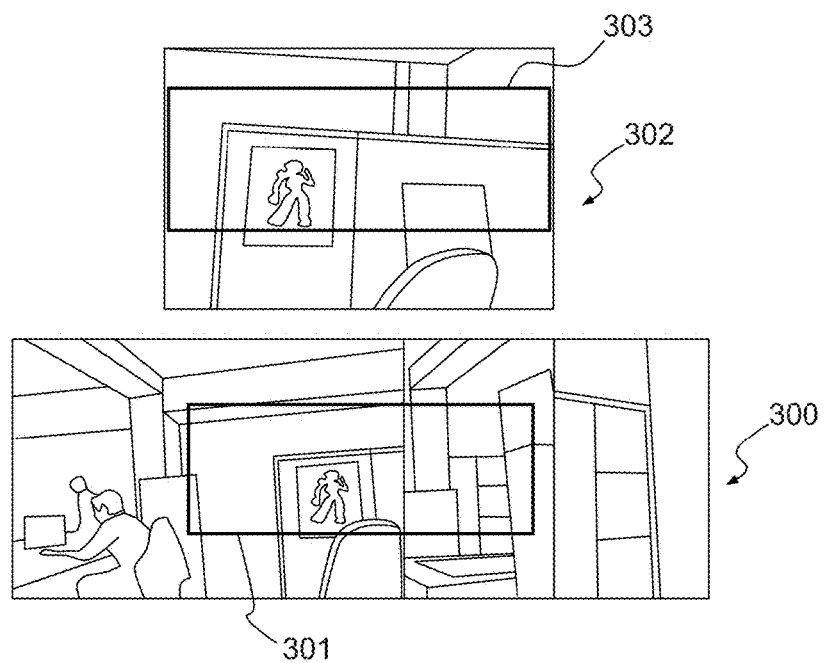
FIG. 3 shows an example of two templates belonging respectively to a reference image and to a query image.

To match two images, first templates 301 are made out of a reference image 300 which belongs to the reference panorama. Then, the cross correlation between said first templates and second templates 303 in the query image 302 are computed. The peak value corresponds to the best correlation between the query and the reference. FIG. 3 shows an example of two templates 301, 303 belonging respectively to a reference image 300 and to a query image 302. In this example, templates 300, 302 have been matched because their corresponding correlation value is the peak value which has been obtained by the correlation process.

In one embodiment, the aforementioned comparison between a reference image and a query image is performed over a pyramid of scaled images. This improves the robustness of step 204 when facing scale changes.

Figure 4:
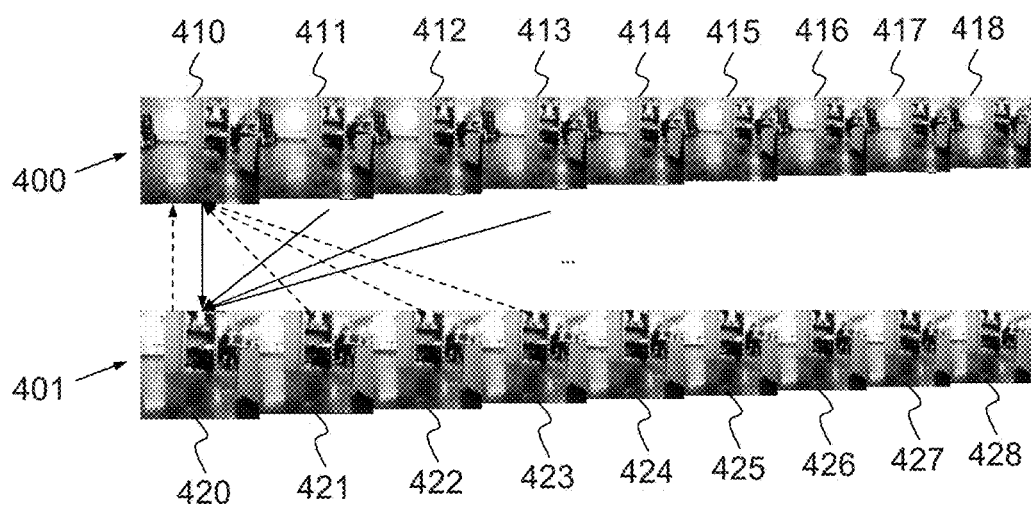
FIG. 4 gives an example of two pyramid of images.

FIG. 4 gives an example of two pyramids of images. A first pyramid of images 401 is generated from a single reference image 420 by downscaling it using several scaling steps, and each of the images 420-428 is compared to the original query image 410. If the query image 410 is in fact downscaled compared to the original query image, then there will be a high correlation peak at the corresponding step in the pyramid.

Symmetrically, the query image 410 is downscaled 410-418 in order to obtain a second pyramid of images 400. Each image 410-418 is then compared to the reference image 420. If the query image 410 is zoomed compared the reference one 420, then the will be a correlation peak corresponding to one of the downscaled imaged 421-428.

The pair of images for which the correlation value is maximized is selected.

The outputs of step 204 are the relative orientation θ3 of the query image compared to the reference and the best scale factor between the two.

Step 204 uses a part of the reference panorama 100 as a template. If a preliminary hypothesis is provided by step 200 and/or step 202, then the size of the template is limited around the hypothesis, else the template is taken as the whole panorama. This reduces the computation time which is proportional to the area of the template, and the risk of correlating with a similar yet incorrect zone.

The uncertainty of the estimations provided by the application of step 204 is determined 205 using the best correlation value. The correlation value can be bound between −1 and 1. If this maximum correlation value is less or equal than a predefined value Ct, the estimation provided by the application of step 204 is not considered as reliable. If the maximum correlation value is greater than this predefined value Ct, the estimation provided by the application of step 204 is considered as reliable.

Alternatively, the standard deviation $\sigma\_\theta3$ of θ3 can be used to check 205 the reliability of this estimation. As already explained, an estimation can be considered as reliable when its standard deviation is lower than a predefined threshold.

Then, a step 206 performs an estimation of the robot coordinates x4, y4 by using an ICP method (Iterative Closest Points). This method is described for example in the article of Qi-Zhi Zhang and Ya-Li Zhou entitled "A hierarchical iterative closest point algorithm for simultaneous localization and mapping of mobile robot", 10th World Congress on Intelligent Control and Automation (WCICA), pp. 3652, 3656, 6-8 Jul. 2012.

For that purpose, a 3D sensor computes point clouds. Then, lines from the 3D point clouds are extracted in order to simplify the process. These lines will be referenced in the following as "scans" and correspond to a horizontal cut of the 3D point cloud.

The current robot position is estimated by using an Iterative Closest Points method. The ICP method is a classical approach which is widely used in robotics. It consists into moving the query scan from a starting point in order to align it with the reference scan.

The uncertainty can be derived from the Champfer distance of the reference scan with the final repositioned query scan (which depends on the distance from each query scan point to the nearest reference one).

The standard deviations $\sigma\_x4$, $\sigma\_y4$ of x4, y4 can be used to check 207 the reliability of this estimation. As already explained, an estimation can be considered as reliable when its standard deviation is lower than a predefined threshold.

The robustness and convergence time of the ICP is highly dependent on the starting point. If it has reliable preliminary hypotheses, the algorithm will converge quickly and reliably. If not, it might give false alignments. If there is no hypothesis available, the element tries to construct one by matching recognizable shapes from the reference scan in the query, in order to get a first approximation. This approximation is then used as a hypothesis. The method according to the invention implements the ICP step 206 as its last estimation step. In other words, the estimations 200, 202 and 204 which are performed before have the effect of providing reliable hypothesis at the input of step 206 and therefore drastically reduces its computational needs.

Steps 200, 202, 204 and 206 taken independently have their own drawbacks and weaknesses. Some require a previous hypothesis in order to improve their convergence rate, or are prone to false positives. Most provide only partial information. As an example, step 202 provides only an estimation θ2 of the orientation of the robot.

In this invention, the estimation steps are sequenced in a predefined order. This predefined order is designed so that the estimation of a given step will benefit to the estimation steps which are applied subsequently. Then, the partial estimations which are provided by the aforementioned steps are combined to generate a global estimation.

For each step in the hierarchy, the estimations are provided as preliminary hypothesis to the next step. For example, the x1, y1 and θ1 estimated by step 200 are provided as a preliminary hypothesis to steps 202, 204 and 206.

By applying steps 200, 202, 204 and 206 one after the other from the most simple and robust 200 to the most complex and error prone 206, the global computation time as well as the robustness of the estimation are improved.

The way steps 200, 202, 204 and 206 are ordered is an essential aspect of the invention. Indeed, this hierarchy, that is to say how the steps are ordered, has been chosen to minimize the computation time and to improve the success rate of each step. However, in one embodiment, the estimations are not transmitted 230, 231, 232 if they are not considered reliable.

The odometry 200 is the less complex process and provides a reliable output as long as the robot has not been pushed or has not moved too much. The compass 202 is slower, but provides a rather quick and reliable computation of the orientation of the robot and benefits from having a starting point provided by the odometry 200. The correlation step 204 is heavy in term of computation and error prone if the search is performed in the wrong direction. However, this technique has a much higher success rate when it uses hypotheses on the orientation and is more precise than the compass 202 if successful. Finally, the ICP 206 provides a reliable x-y estimation if the convergence succeeds, which is the case if it has preliminary hypotheses, in particular in orientation.

Steps 200, 202, 204, 206 give their output in the form of estimations. These estimations can be converted into distributions of probability which are then combined in order to get global probability distributions.

For that purpose, the standard deviation $\sigma\_x1$, $\sigma\_y1$, $\sigma\_\theta1$, $\sigma\_\theta2$, $\sigma\_\theta3$, $\sigma\_x4$ and $\sigma\_y4$ are used to generate probability distributions $G(x1)$, $G(y1)$, $G(\theta1)$, $G(\theta2)$, $G(\theta3)$, $G(x4)$ and $G(y4)$.

These probability distributions can be generated 220 using the following principle: $G(x1)$ is a Gaussian distribution whose standard deviation is equal to $\sigma\_x1$. $G(y1)$, $G(\theta1)$, $G(\theta2)$, $G(\theta3)$, $G(x4)$ and $G(y4)$ can be generated using the same principle.

Then, global probability distributions are generated. For that purpose, it is assumed that all the steps 200, 202, 204, 206 are independent. This is true in practice because reliable outputs are taken only as preliminary hypotheses whereas the final result can be significantly different. Additionally, x, y and θ can be also considered as independent. Using these hypotheses, three global distributions $GLOB(x)$, $GLOB(y)$ and $GLOB(\theta)$ can be computed 221 as follow:

$$GLOB(x) = G(x1) \times G(x4)$$

$$GLOB(y) = G(y1) \times G(y4)$$

$$GLOB(\theta) = G(\theta1) \times G(\theta2) \times G(\theta3)$$

The maximum likelihood of this distribution corresponds to the final estimation 209 of the position. Additionally, it is also possible to derive a degree of certainty by looking at the cumulated distribution function of the global distribution.

Figure 5:
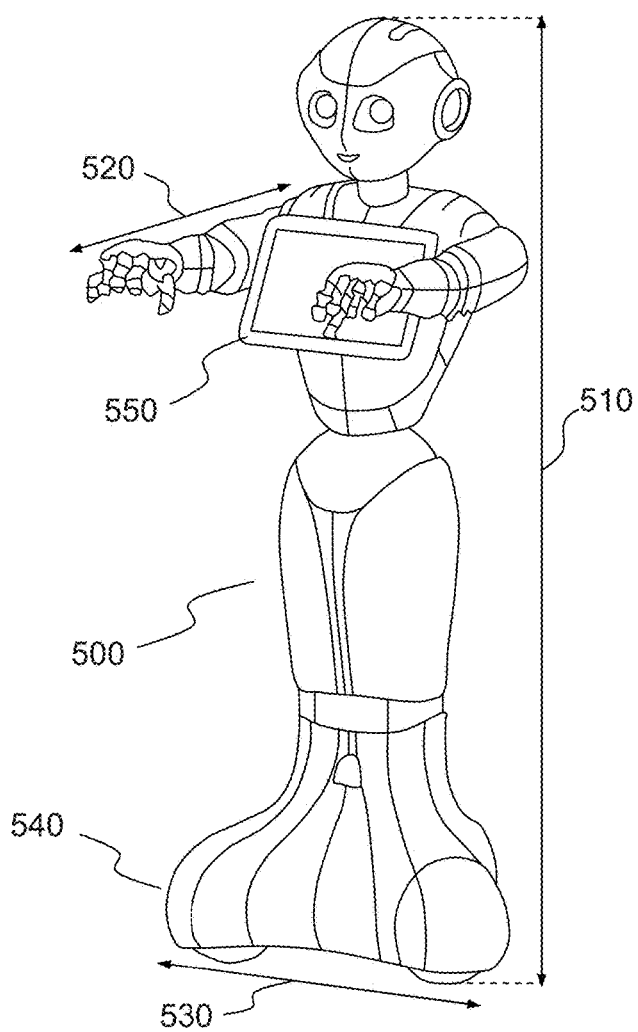
FIG. 5 displays a physical architecture of a humanoid robot in a number of embodiments of the invention.

FIG. 5 displays a physical architecture of a humanoid robot in a number of embodiments of the invention.

A robot can be qualified as humanoid from the moment when it has certain human appearance attributes: a head, a trunk, two arms, two hands, etc. A humanoid robot may, however, be more or less sophisticated. Its limbs may have a greater or lesser number of articulations. It may control its own balance statically and dynamically and walk on two limbs, possibly in three dimensions, or simply roll over a base. It may pick up signals from the environment ("hear", "see", "touch", "sense", etc.) and react according to more or less sophisticated behaviors, and interact with other robots or humans, either by speech or by gesture.

The specific robot 500 on the figure is taken as an example only of a humanoid robot in which the invention can be implemented. The lower limb of the robot on the figure is not functional for walking, but can move in any direction on its base 540 which rolls on the surface on which it lays. The invention can be easily implemented in a robot which is fit for walking. By way of example, this robot has a height 510 which can be around 120 cm, a depth 520 around 65 cm and a width 530 around 40 cm. In a specific embodiment, the robot of the invention has a tablet 550 with which it can communicate messages (audio, video, web pages) to its environment, or receive entries from users through the tactile interface of the tablet. In addition to the processor of the tablet, the robot of the invention also uses the processor of its own motherboard, which can for example be an ATOM™ Z530 from Intel™. This robot can also advantageously include a processor which is dedicated to the handling of the data flows between the motherboard and, notably, the boards bearing the Magnetic Rotary Encoders (MREs) and sensors which control the motors of the joints in a limb and the balls that the robot uses as wheels, in a specific embodiment of the invention. The motors can be of different types, depending on the magnitude of the maximum torque which is needed for a definite joint. For instance, brush DC coreless motors from e-minebea™ (SE24P2CTCA for instance) can be used, or brushless DC motors from Maxon™ (EC45_70W for instance). The MREs are preferably of a type using the Hall effect, with 12 or 14 bits precision.

In embodiments of the invention, the robot displayed on FIG. 1 also comprises various kinds of sensors. Some of them are used to control the position and movements of the robot. This is the case, for instance, of an inertial unit, located in the torso of the robot, comprising a 3-axes gyrometer and a 3-axes accelerometer. The robot can also include two 2D color RGB cameras on the forehead of the robot (top and bottom) of the System On Chip (SOC) type, such as those from Shenzen V-Vision Technology Ltd™ (OV5640), with a 5 megapixels resolution at 5 frames per second and a field of view (FOV) of about 57° horizontal and 44° vertical. One 3D sensor can also be included behind the eyes of the robot, such as an ASUS XTION™ SOC sensor with a resolution of 0.3 megapixels at 20 frames per second, with about the same FOV as the 2D cameras. The robot of the invention can also be equipped with laser lines generators, for instance three in the head and three in the base, so as to be able to sense its relative position to objects/beings in its environment. The robot of the invention can also include microphones to be capable of sensing sounds in its environment. In an embodiment, four microphones with a sensitivity of 300 mV/Pa +/−3 dB at 1 kHz and a frequency range of 300 Hz to 12 kHz (−10 dB relative to 1 kHz) can be implanted on the head of the robot. The robot of the invention can also include two sonar sensors, possibly located at the front and the back of its base, to measure the distance to objects/human beings in its environment. The robot can also include tactile sensors, on its head and on its hands, to allow interaction with human beings. It can also include bumpers on its base to sense obstacles it encounters on its route.

To translate its emotions and communicate with human beings in its environment, the robot of the invention can also include:
  LEDs, for instance in its eyes, ears and on its shoulders;
  Loudspeakers, for instance two, located in its ears.

The robot may communicate with a base station or other robots through an Ethernet RJ45 or a WiFi 802.11 connection.

The robot can be powered by a Lithium Iron Phosphate battery with an energy of about 400 Wh. The robot can access a charging station fit for the type of battery that it includes.

Position/movements of the robots are controlled by its motors, using algorithms which activate the chains defined by each limb and effectors defined at the end of each limb, in view of the measurements of the sensors.

The apparatus, methods and configurations as described above and in the drawings are for ease of description only and are not meant to restrict the apparatus or methods to a particular arrangement or process in use. The invention has been described for a humanoid robot but the skilled person will appreciate that it can be applicable to any mobile element such as a car.

The invention claimed is:

1. A method for localizing a robot in a localization plane associated with a bi-dimensional reference with two axes x and y comprising the following steps:
- determining by odometry an estimation of the coordinates x1 and y1 of the robot in the localization plane as well as an estimation of its orientation θ1 relatively to a reference direction;
- determining an estimation θ2 of the orientation of the robot by using a virtual compass which identifies at least two pairs of points of interest, first points of each pair being identified in a reference panorama and second point of each pair being identified in a query panorama, this step being initialized with θ1;
- determining an estimation θ3 of the orientation of the robot by correlating parts of the reference panorama with parts of the query panorama and by identifying when that correlation is maximized, this step being initialized with one of the previous estimations of the orientation;
- determining an estimation x4, y4 of the robot position in the localization plane by using an Iterative Closest Points technique, this step being initialized with x1 and y1, the iterative Closest Points techniques using a 3D point cloud as an input and preliminary hypotheses in orientation;
- determining the standard deviations σ_x1, σ_y1, σ_θ1 σ_θ2, σ_θ3, σ_x4, σ_y4 of the aforementioned estimations;
- determining Gaussian probability distributions G(x1), G(y1), G(θ1), G(θ2), G(θ3), G(x4) and G(y4) of each available estimation using said standard deviations;
- determining three global distributions GLOB(x), GLOB(y) and GLOB(θ) respectively for the coordinates along the x and y axis and for the orientation θ of the robot by combining said Gaussian probability distributions and determining a global estimation xg, yg of the coordinates of the robot in the localization plane as well as an global estimation θg of its orientation by applying the method of maximum likelihood to the global distributions.

2. The method according to claim 1, wherein the estimations provided by a given step are used by a subsequent step only if considered as reliable.

3. The method according to claim 2, wherein an estimation is considered as reliable when its standard deviation is lower than a predefined threshold.

4. The method according to claim 1, wherein the global probability distributions are derived as follow:

$$GLOB(x)=G(x1)*G(x4)$$

$$GLOB(y)=G(y1)*G(y4)$$

$$GLOB(\theta)=G(\theta1)*G(\theta2)*G(\theta3).$$

5. The method according to claim 1, wherein θ3 value is estimated based on an image template matching which is performed over two pyramids of images, a first pyramid of images being generated from a single reference image by downscaling it using several scaling steps, the second pyramid of images being generated from a single query image by downscaling it using several scaling steps.

6. A humanoid robot comprising at least:
- 2D RGB camera in order to construct a query panorama comprising at least one reference image;
- processing capabilities to implement a method for localizing said robot, based on said query panorama, in a localization plane associated with a bi-dimensional reference with two axes x and y comprising the following steps:
  - determining by odometry an estimation of the coordinates x1 and y1 of the robot in the localization plane as well as an estimation of its orientation θ1 relatively to a reference direction;
  - determining an estimation θ2 of the orientation of the robot by using a virtual compass which identifies at least two pairs of points of interest, first points of each pair being identified in a reference panorama and second point of each pair being identified in said query panorama, this step being initialized with θ1;
  - determining an estimation θ3 of the orientation of the robot by correlating parts of the reference panorama with parts of the query panorama and by identifying when that correlation is maximized, this step being initialized with one of the previous estimations of the orientation;
  - determining an estimation x4, y4 of the robot position in the localization plane by using an Iterative Closest Points technique, this step being initialized with x1 and y1, the iterative Closest Points techniques using a 3D point cloud as an input and preliminary hypotheses in orientation;
  - determining the standard deviations σ_x1, σ_y1, σ_θ1 σ_θ2, σ_θ3, σ_x4, σ_y4 of the aforementioned estimations;
  - determining Gaussian probability distributions G(x1), G(y1), G(θ1), G(θ2), G(θ3), G(x4) and G(y4) of each available estimation using said standard deviations;
  - determining three global distributions GLOB(x), GLOB(y) and GLOB(θ) respectively for the coordinates along the x and y axis and for the orientation θ of the robot by combining said Gaussian probability distributions and determining a global estimation xq, yg of the coordinates of the robot in the localization plane as well as an global estimation θg of its orientation by applying the method of maximum likelihood to the global distributions.

7. The humanoid robot according to claim 6, wherein a 3D sensor is used to compute point clouds in order to implement the Iterative Closest Point Technique.

8. A computer program product, stored on a non-transitory computer readable medium comprising code instructions for causing a computer to implement a method of for localizing a robot in a localization plane associated with a bi-dimensional reference with two axes x and y comprising the following steps:
- determining by odometry an estimation of the coordinates x1 and y1 of the robot in the localization plane as well as an estimation of its orientation θ1 relatively to a reference direction;
- determining an estimation θ2 of the orientation of the robot by using a virtual compass which identifies at least two pairs of points of interest, first points of each pair being identified in a reference panorama and second point of each pair being identified in said query panorama, this step being initialized with θ1;
- determining an estimation θ3 of the orientation of the robot by correlating parts of the reference panorama with parts of the query panorama and by identifying when that correlation is maximized, this step being initialized with one of the previous estimations of the orientation;
- determining an estimation x4, y4 of the robot position in the localization plane by using an Iterative Closest Points technique, this step being initialized with x1 and y1, the iterative Closest Points techniques using a 3D point cloud as an input and preliminary hypotheses in orientation;

determining the standard deviations $\sigma\_x1$, $\sigma\_y1$, $\sigma\_\theta1$ $\sigma\_\theta2$, $\sigma\_\theta3$, $\sigma\_x4$, $\sigma\_y4$ of the aforementioned estimations;

determining Gaussian probability distributions $G(x1)$, $G(y1)$, $G(\theta1)$, $G(\theta2)$, $G(\theta3)$, $G(x4)$ and $G(y4)$ of each available estimation using said standard deviations;

determining three global distributions $GLOB(x)$, $GLOB(y)$ and $GLOB(-\theta)$ respectively for the coordinates along the x and y axis and for the orientation $\theta$ of the robot by combining said Gaussian probability distributions and determining a global estimation $xg$, $yg$ of the coordinates of the robot in the localization plane as well as an global estimation $\theta g$ of its orientation by applying the method of maximum likelihood to the global distributions.

\* \* \* \* \*